United States Patent Office 3,451,583
Patented June 24, 1969

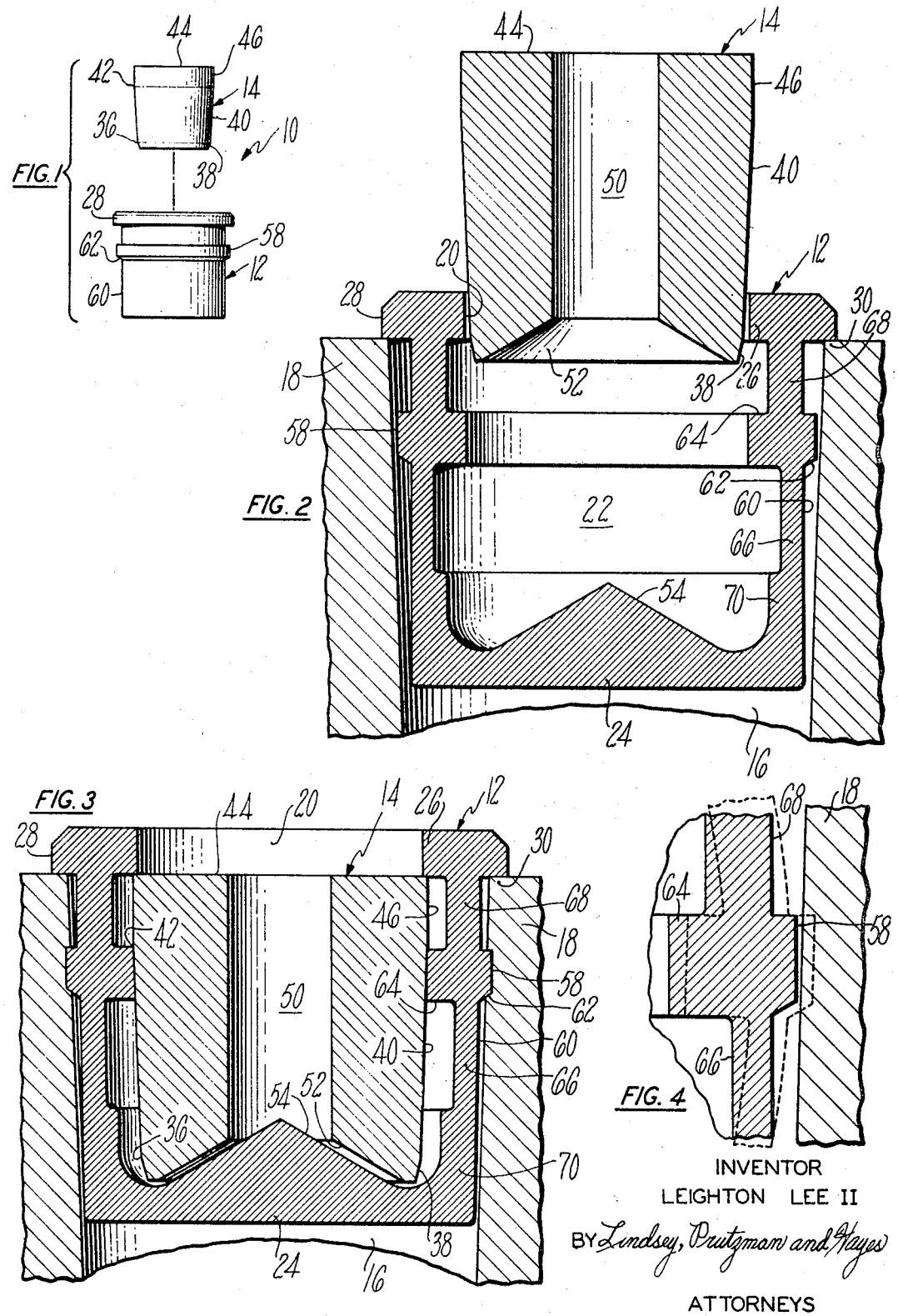

3,451,583
EXPANDABLE SEALING PLUG
Leighton Lee II, Guilford, Conn., assignor to The Lee Company, Westbrook, Conn., a corporation of Connecticut
Filed May 20, 1968, Ser. No. 730,534
Int. Cl. B65d *39/12;* F16l *55/12*
U.S. Cl. 220—24.5                                    10 Claims

ABSTRACT OF THE DISCLOSURE

A plug for sealing apertures of varying size and taper in die castings includes a hollow cylindrical plug member radially expandable upon insertion of a tapered pin therein. An inwardly projecting ring of limited depth intermediate the ends of the plug is driven radially by the high taper of the pin causing an aligned external land to bite into the casting below the surface of the aperture being sealed. The plug member is provided with a support shoulder for contacting the lip of the aperture and preventing axial displacement of the member during insertion of the pin. The taper on the pin facilitates the use of a short pin which is fully received within the hollow of the plug and locked therein by an inwardly projecting extension of the support shoulder of the plug.

*Background and summary of the invention*

This invention relates to sealing devices and particularly to sealing plugs for die castings and like products.

In the metal working field access holes or passages must frequently be provided in castings and the like in order to facilitate internal machining or to provide means for cross connecting internal fluid carrying passages. These openings are subsequently closed by plugs to avoid contamination within the passages and prevent fluid leakage. The plug described in my United States Patent No. 2,821,323, issued Jan. 28, 1958 and captioned "Pin Plug," is particularly well suited for this purpose. The pin plug uses a tapered pin to expand and frictionally lock an internally tapered plug seated within a reamed opening. Although such pin plugs are well suited for use with forged or high quality cast or bar stock products, plugs for die cast products require somewhat different performance characteristics. In particular it should be noted that die cast bosses vary substantially in the taper and accuracy of their openings. Also, such bosses would require substantial bulk if high stress loads are to be applied thereto and reaming of such material breaks the strong, homogeneous skin on the surface of the casting, exposing the softer interior which is frequently porous in spots. Accordingly, providing die castings with bosses large enough to withstand the stresses of sealing devices is economically undesirable, as is the added expense of drilling and reaming.

Accordingly, it is an object of this invention to provide a new and improved sealing device of the pin plug type which obviates the necessity for large bosses or expensive reaming operations yet is particularly suited for sealing openings in die cast products despite variations in the size and taper of die cast openings.

An additional object of this invention is to provide a sealing plug of the type described which is independent of the tapers used in the die casting art yet facilitates the utilization of a relatively short, tapered pin for sealing and locking the plug within unmachined die cast apertures devoid of internal seal receiving shoulders.

A further object is to provide an improved sealing plug of the type described which provides high stress concentration below the lip of the opening being sealed together with acceptable stress levels at the normally more vulnerable areas of the casting adjacent the opening.

Another object of this invention is to provide a sealing plug as described which utilizes limited, progressively larger areas of a tapered pin and effectively seals with a single sealing land which bites into the casting in an axially localized portion of the aperture.

Still another object of this invention is to provide a pin plug which precludes failure of the seal due to slippage while at the same time providing both its own support during mounting of the tapered sealing pin and a secure lock for the pin when mounted.

A still further object of this invention is to provide a pin plug of the type described which reduces the longitudinal work load acting on the pin.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

*Brief description of the drawings*

In the drawings:
FIG. 1 is an exploded side elevational view depicting an embodiment of the sealing plug assembly of the present invention;
FIG. 2 is an enlarged side sectional view of the plug of FIG. 1, partly assembled;
FIG. 3 is an enlarged side sectional view similar to FIG. 2 with the plug fully assembled; and
FIG. 4 is a fragmentary, substantially enlarged sectional view of the sealing ring of the assembly, depicting its expandable position in phantom.

*Description of a preferred embodiment*

Referring now to the drawings in greater detail, wherein like reference numerals indicate like parts throughout the several figures, a sealing plug assembly, generally designated 10, is shown as being comprised of a plug 12 within which is fully received an expander pin 14 for sealing an aperture 16 in a die cast member, such as the boss 18. The cylindrical plug 12 is of generally tubular construction with its central cavity 22 enclosed at one end by base 24 and its opposite end constricted by the integral, inwardly extending ring 26. An annular shoulder portion 28 extends radially outwardly from ring 26 so that upon initial insertion of plug 12 in the aperture 16, the shoulder will overlie a terminal edge or lip 30 of the aperture 16 and act as the sole support of the plug 12. As shown in FIG. 2, it is an advantage of the present invention that the shoulder 28 need be the only portion of the plug 12 having substantial contact with the boss 18 prior to mounting the pin 14 within the cavity 22 for sealing and locking the plug assembly 10 within the aperture 16.

As mentioned, the ring 26 of plug 12 defines the entrance or opening 20 of the cavity 22 into which the cylindrical pin 14 is driven. The unstressed condition of the plug at ring 26 is normally such that the opening 20 is of greater diameter than the bottom or lead edge 36 of the pin 14 and therefore the pin 14 is readily and simply positioned within the entrance opening 20 of cavity 22 as shown in FIG. 2. A short highly tapered external surface 38 located on the pin adjacent edge 36 additionally facilitates easy insertion of the pin and is abutted by an elongated, external cam or working surface 40 which extends from surface 38 away from edge 36. The external diameter of pin 14 gradually and uniformly increases along cam surface 40 for a distance of about two-thirds the peripheral length of the pin until it reaches a maximum at the point designated 42, a short distance below the flat top surface 44 of the pin. As shown a substantially vertical and uniform wall portion 46 joins the cam surface 40 to the top surface 44. The pin 14 is additionally provided with an axial bore 50 extending through its entire length to facilitate venting of any entrapped air within the cavity 22 as the pin is driven into the plug. The bottom terminal portion 52 of the bore 50 is flared outwardly to conform to the shape of the internal convex surface 54 on the dome-shaped base 24 of the plug, thereby providing for the compact nesting of the pin within the plug. As shown, the total length of pin 14 is such that it will fit within cavity 22 beneath the locking ring 26 and be frictionally held by the plug so that portion 52 need not necessarily be in contact with surface 54.

In accordance with the present invention, the seal between the boss 18 and the assembly 10 is effected well below the lip 30 of the opening 16. For that purpose the plug 12 is preferably provided with a single external sealing ring or land 58 axially spaced from shoulder 28 and projecting outwardly from the cylindrical exterior wall 60 of the integral plug for biting into the boss 18 in the manner depicted in FIG. 3. The sealing land 58 is of shallow depth relative to the length of the plug, is substantially concentric with shoulder 28 and includes an inclined bottom surface 62 facilitating insertion of the plug 12 into the aperture 16. The external diameter of land 58 in its relaxed condition is slightly less than the confronting portion of the aperture 16 thus permitting the plug 12 to be easily positioned within the aperture while being fully supported through the cooperative engagement of shoulder 28 with lip 30.

The plug 12 is also provided with a cavity dividing drive ring or land 64 extending radially inwardly of land 58 to further constrict cavity 22 by a greater amount than ring 26 and preferably provide an opening of substantially the same size as the minimum diameter of cam surface 40. Referring particularly to FIG. 2, it can be seen that when the pin 14 is placed within the entrance opening 20 of plug 12, the minimum diameter of cam surface 40 adjacent taper 38 will contact the top of the drive ring 64 while the locking ring 26 abuts the mid-portion of the cam surface. The expander pin 14 may then be driven into cavity 22 causing cam surface 40 to slowly and simultaneously expand both the locking ring 26 and the drive ring 64, causing flexure of plug 12 at its narrow cylindrical side wall portion 66 located below rings 58, 64. At the same time shoulder 28 is driven radially outwardly into greater surface engagement with the boss 18. Accordingly, the shoulder 28 provides increased holding power as greater axial force is applied to the plug thereby assuring firm support for the plug during the sealing and locking operation. It will be appreciated that axial movement of the pin by a distance equal to about one-half the length of cam surface 40 will bring the cylindrical surface 46 of the pin into contact with ring 26 terminating its radial expansion. However, cam surface 40 will continue to drive the ring 64 and seal land 58 radially outwardly as the pin moves further into cavity 22. Although the camming action of surface 40 against ring 64 concentrates relatively high stresses on the boss 18 at the area of contact by land 58, it is an advantage of the present invention that such stresses are localized well below the lip 30 of the boss. As shown, the radially aligned lands 58 and 64 are preferably located below the lip 30 by a distance approximately equal to one-fifth or more the length of the plug whereby the stresses are sufficiently distributed before reaching the lip 30 so that cracking of the same is avoided. Furthermore, use of just a single annular sealing land 58 presents to the boss 18 only a narrow band of stresses so that proportionally, except for the one general area of stress, the boss 18 is quite free from stress and can be made smaller than has heretofore been possible.

Secure locking of the single land 58 against the boss is ensured by preventing removal of the pin after expansion of the plug. In this connection the wall portion 66 immediately below sealing ring 58 is relatively thinner than the remainder of plug 12 while the wall portion 68 between ring 58 and shoulder 28 is of substantially greater thickness to provide the desired interference locking of the pin by the ring 26. Thus as the top surface 44 of the pin 14 passes beneath the ring 26, the shoulder 28 and ring 26 will snap radially inwardly, causing the ring 26 to cover the edge of surface 44 and thus lock the pin 14 within the plug 12. As mentioned, this mechanical locking of the pin in the plug ensures that the sealing and locking engagement of the land 58 against the boss 18 will be maintained while at the same time eliminating the need to utilize working tapers which are less than those needed to ensure frictional locking. Indeed, although the entire cam surface 40 of pin 12 has done work during assembly, the only continuous contact between plug 12 and pin 14 is at the point 42 of maximum pin circumference which, as shown in FIG. 3, abuts ring 64 as the surface 44 of the pin is positioned below ring 26. In this connection experiments have also shown that the driving force on the pin at this position is substantially decreased.

Additionally, the tendency of shoulder 28 and ring 26 to retract radially inwardly also contributes a controlling influence upon the maximum possible expansion of the plug 12. That is, as the cam surface forces the land 64 radially outwardly into the boss 18, the shoulder and ring retract radially inwardly resulting in the bowed configuration depicted in phantom in FIG. 4. Thereby the snap-in locking feature of the present invention to some extent restrains the land 64 and desirably prevents penetration of the boss to a depth that might cause the boss to crack.

It will, of course, be appreciated that the maximum working taper, the sizing of the lands, and the thickness and elasticity of the wall portions of the plug all must be considered in the proper design and construction of the plug. In this connection it will be appreciated that the plug 12 may be reinforced adjacent its base as at 70. Additionally, it is a feature of the present invention that the degree of camming action by surface 40 necessary to achieve engagement is selected to provide maximum expansion of the sealing land 58 with a minimum length of pin 14. For example, to accommodate the greater expansion of the plug needed for sealing die castings, it has been found that a taper of about 0.96" per foot on cam surface 40 is desirable on a pin having a total length slightly greater than a quarter of an inch.

It should also be noted that in the illustrated embodiment the base 24 of the plug increases in thickness toward its center to preclude deformation of the plug under fluid pressure, which deformation might drive the bottom base 24 into the pin 14 with sufficient force to eject the pin despite its being mechanically locked. By reason of the pin 14 having contact with the plug 12 only through land 64, it can be understood that the pin never feels the fluid pressure acting against the plug.

Thus, as can be seen from the foregoing description, the structure of the present invention provides a minimum size plug for sealing die castings regardless of the tapers used in the castings. The plug provides controlled expansion while considerably reducing the total load bearing on the pin member in a longitudinal direction. Additionally, it limits the effective contact with the sealed member to a relatively narrow band spaced from the surface of the member thereby reducing the stress forces at the surface and facilitating use of smaller bosses in die casting members.

I claim:

1. A sealing plug assembly suited for sealing an opening of a die cast member by localized controlled expansion comprising an elongated plug insertable within the opening for positioning a major portion thereof below the lip of the opening, said plug having an axially extending cavity therein and an inwardly projecting land located in spaced relationship to both ends of the plug and being positioned below the lip of the opening upon insertion of the plug therein, said land constricting the cavity and defining upper and lower cavity chambers of greater cross-sectional area than the cavity at the constriction; and an expander pin insertable into the cavity and having an outer cam surface for drivingly contacting the inwardly projecting land and expanding the plug within a localized area adjacent the land, thereby concentrating the sealing action of the plug at said localized area intermediate the ends of the plug and below the lip of the opening.

2. The plug assembly of claim 1 wherein the cavity is of greater length than the pin and the plug is provided with an inwardly extending lip at one end of the cavity defining a cavity entrance smaller than the pin whereby the lip provides an interference lock against removal of the pin upon insertion of the pin in the cavity.

3. The plug assembly of claim 1 wherein the plug is provided with an exterior supporting shoulder for contacting the lip of the opening upon insertion of the plug therein, said shoulder being expandable to provide increased contact with the lip during insertion of the pin within the cavity.

4. The plug assembly of claim 1 wherein the plug is provided with outwardly projecting sealing means at said localized area intermediate the ends of the plug for biting into the die cast member below the lip of the opening upon expansion of the plug by the expander pin.

5. The plug assembly of claim 1 wherein the plug is provided with a base enclosing one end of the cavity, said base being of greater thickness adjacent its center to prevent collapse under high external pressure.

6. The plug assembly of claim 1 wherein the length of the cam surface is approximately equal to the depth of the lower cavity chamber and substantially the entire length of the cam surface is brought into contact with the land as the pin is inserted in the cavity.

7. The sealing plug assembly of claim 1 wherein the plug is a generally cylindrical member and the land is an internal ring integral with the plug, said plug being additionally provided with an integral external sealing ring in substantial radial alignment with said internal ring for biting into the die cast member below the lip of the opening and a locking member spaced from the internal ring for retaining the pin within the plug.

8. The sealing plug assembly of claim 7 wherein the pin is a generally cylindrical member whose external diameter increases axially along the cam surface and the minimum diameter of the cam surface is substantially equal to the diameter of the constriction defined by the internal land whereby the cam surface progressively expands the radially aligned rings and drives the external ring into biting and sealing engagement with the die cast member upon axial displacement of the pin toward the lower cavity chamber.

9. The sealing plug assembly of claim 7 wherein the plug is provided with a terminal annular support shoulder concentric with the sealing ring for contacting the lip of the opening and the locking member includes a locking ring adapted for contact by a least a portion of the cam surface during insertion of the pin for resiliently expanding the locking ring and facilitating interference locking of the pin within the plug.

10. The sealing plug assembly of claim 8 wherein the plug is provided with a terminal annular support shoulder concentric with the sealing ring for contacting the lip of the opening and the locking member includes a locking ring adapted for contact by at least a portion of the cam surface during insertion of the pin for resiliently expanding the locking ring and facilitating interference locking of the pin within the plug.

References Cited

UNITED STATES PATENTS

| | | | |
|---|---|---|---|
| 2,821,323 | 1/1958 | Lee | 220—24.5 |
| 3,135,414 | 6/1964 | Lee | 220—24.5 |

GEORGE T. HALL, *Primary Examiner.*

U.S. Cl. X.R.

138—89; 215—52